Dec. 13, 1955     E. R. PRICE     2,726,884
SEAL FOR RECIPROCATING MEMBER
Filed Dec. 11, 1950
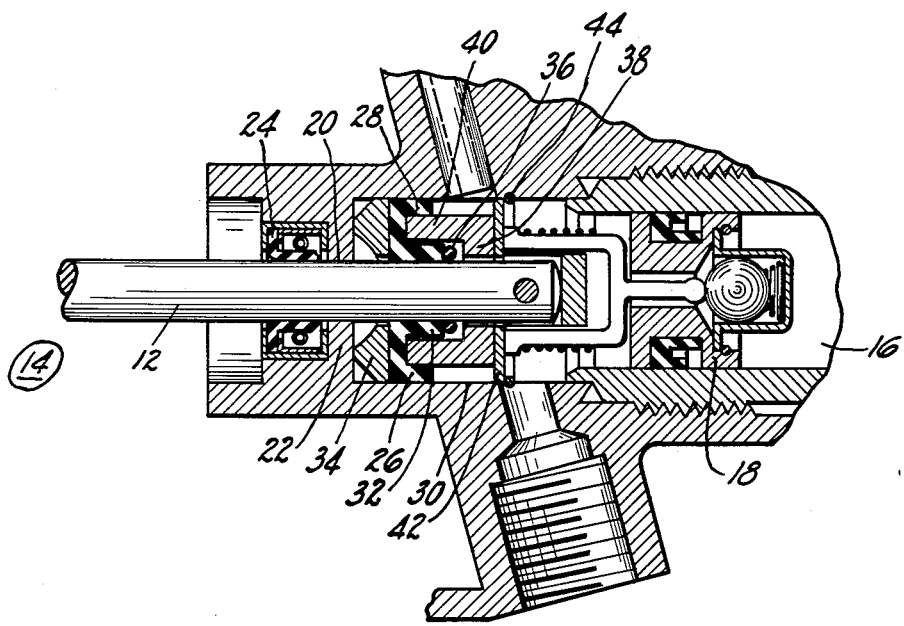
INVENTOR.
EARL R PRICE
BY
T. J. Plante
ATTORNEY

United States Patent Office 2,726,884
Patented Dec. 13, 1955

2,726,884

SEAL FOR RECIPROCATING MEMBER

Earl R. Price, South Bend, Ind., assignor to Bendix Aviation Corporation, South Bend, Ind., a corporation of Delaware Application December 11, 1950, Serial No. 200,187

3 Claims. (Cl. 286—26)

This invention relates to an improved seal for a reciprocating member. It was originated to overcome a sealing problem encountered in providing booster units for hydraulic brake systems, but can, of course, be applied to any other use where similar sealing difficulties occur.

In booster units having a hydraulic cylinder operated by a vacuum power cylinder, a pressure-transmitting rod extends from the power cylinder piston (or diaphragm) into the hydraulic cylinder and moves the hydraulic piston on its pressure stroke under the force exerted by the power piston. The leakage most likely to occur in booster units of this type is leakage along the periphery of the pressure-transmitting rod. My experiments have indicated that the leakage almost invariably occurs during the return stroke of the rod. It appears that there are successive grabbing and slipping actions of the sealing lip on the rod during the return stroke, which may permit small quantities of liquid to escape from the hydraulic cylinder into the power cylinder. Although the amount of leakage which occurs in this way is a minor factor in the average booster unit, it is, of course, desirable to reduce leakage to the lowest amount possible, thereby causing the reservoir supply of fluid to require less replenishment.

I have found that leakage through the rod opening in booster units of this type can be substantially eliminated by the expedient of providing the combination of a sealing ring having a lip which engages the periphery of the rod with a sealing ring which is mounted on the rod ahead of the lip and which engages the end of the lip during the return stroke of the rod.

The above and other advantages of the invention will appear more fully hereinafter from a consideration of the following description, taken in connection with the accompanying drawing, wherein an embodiment of the invention is illustrated by way of example. In the drawing:

The single figure is an enlarged longitudinal section showing my improved seal mounted between a hydraulic cylinder and a power cylinder.

In the illustrated embodiment, the seal is applied to the periphery of a rod 12 which extends from the chamber 14, not shown, of a power cylinder into the chamber 16 of a hydraulic cylinder. The left end (not shown) of rod 12 is acted on by a power piston (or diaphragm) and the rod transmits the force to the piston 18 which is reciprocably mounted in the hydraulic cylinder. The construction details of the hydraulic piston and its connection to rod 12 form no part of the present invention. A similar piston construction is illustrated and described in Ringer application Serial No. 620,905, filed on October 6, 1945, now Patent No. 2,598,604, dated May 7, 1952.

Rod 12 extends through an opening 20 in the center of an annular wall 22 provided between the power cylinder and the hydraulic cylinder. A leather seal 24 engages the rod periphery on the power cylinder side of the wall, in order to keep power cylinder lubricants out of the hydraulic cylinder.

At the other side of wall 22, a lipped sealing ring 26 (formed of a suitable yieldable, resilient material, such as rubber) has an outer lip 28 engaging the wall 30 of the hydraulic chamber and an inner lip 32 engaging the periphery of rod 12. The base of the sealing ring may be supported by a fiber washer 34. The sealing ring 26 is hereinafter sometimes referred to as a "U-section" ring, because of its two concentric lips. The term "U-section" is not intended to be limited in meaning to a sealing ring having lips which are parallel or which are of substantially the same length, since that meaning would have no relationship to the function of the ring. In other words, the ring could have a "J-section" or "V-section" appearance without escaping the scope of the term "U-section" as used herein.

In addition to the lipped sealing ring 26, a second sealing ring 36, (formed of a suitable yieldable, resilient material, such as rubber) is provided on the periphery of rod 12. The sealing ring 36, which preferably has a circular cross-section, as shown, grips the rod ahead of the inner lip 32 of the U-section sealing ring. During the return stroke of rod 12, and in the released position of the unit, sealing ring 36 engages the end of lip 32. Therefore, during the return stroke of the rod, sealing ring 36 prevents hydraulic fluid from reaching the rod-engaging surface of lip 32. Since leakage past lip 32 is limited to the return stroke of the piston, the assistance of sealing ring 36 substantially eliminates leakage from the hydraulic cylinder.

Sealing ring 36 is allowed to move a slight distance away from lip 32 during the pressure stroke of rod 12. The sealing effect of ring 36 is not needed during the pressure stroke, because the lip 32 provides a very efficient seal when the rod is moving into the hydraulic cylinder. Allowing a slight movement of sealing ring 36 away from lip 32 during the pressure stroke has several advantages: (a) it avoids close tolerances in the installing of sealing ring 36; (b) it permits some lubrication of lip 32, thereby prolonging its life; and (c) it prolongs the life of sealing ring 36, because the friction between ring 36 and the rod depends solely on the resilience of the ring material and is not increased by axial compression of the ring.

As the rod 12 moves on its pressure stroke, sealing ring 36 moves with it until the latter engages a suitable retainer, such as the flange 38 of a metal ring 40, which is held in position by a washer 42, the latter being locked in place by a snap ring 44. The amount of forward movement of sealing ring 36 is too slight to permit any leakage during the return stroke, because the sealing ring moves back into engagement with lip 32 as soon as the rod starts on its return stroke.

Although a particular embodiment of my invention has been described, it will be understood by those skilled in the art that the object of the invention may be attained by the use of constructions different in certain respects from that disclosed without departing from the underlying principles of the invention.

I claim:

1. For use in a power-operated hydraulic cylinder having a piston reciprocable in the hydraulic cylinder and a power-operated rod movable in opposite directions extended through one end of the hydraulic cylinder to act on the piston, a seal for the end of the hydraulic cylinder through which the rod extends comprising a stationary U-section sealing ring having an outer lip in engagement with the inner wall of the cylinder and an inner lip in engagement with the rod, a circular cross-section sealing ring which grips the rod ahead of the inner lip of the U-section ring and moves therewith, and which moves into contact with the end of said lip during movement of said rod in one direction, said circular cross-section sealing ring having an outside diameter appreciably less than the outside diameter of the U-section sealing ring and accordingly contactable only with the inner lip of said sealing ring, and a retainer which is spaced slightly from the circular cross-section ring in released position and which limits the forward movement of said ring when the rod moves in the opposite direction.

2. For use in a chamber having a reciprocable member extended through one wall thereof, a seal for the wall of the chamber through which the reciprocable member extends comprising a stationary lipped sealing ring having an inner lip in engagement with the reciprocable member, said ring having a portion engaging the inner wall of the chamber, a circular cross-section sealing ring which grips the reciprocable member ahead of the inner lip and moves with said member, and which engages the end of said lip during movement of said member in one direction, said circular cross-section sealing ring having an outside diameter appreciably less than the outside diameter of the sealing ring and accordingly contactable only with the inner lip of said sealing ring, and a retainer which is spaced slightly from the circular cross section ring in released position and which limits the forward movement of said ring when the reciprocable member moves in the opposite direction.

3. For use in a chamber having a reciprocable member extending through one wall thereof and moveable in opposite directions, a seal for the wall of the chamber through which the reciprocable member extends comprising a first sealing ring having a lip in engagement with the reciprocable member, said ring having a portion engaging the inner wall of the chamber, a second sealing ring which grips the reciprocable member ahead of the lip of the first ring and moves with said member, and which engages the end of said lip during movement of said member in one direction, said second sealing ring having an outside diameter appreciably less than the diameter of the first sealing ring and accordingly contactable only with the lip of said sealing ring, and a retainer which limits the forward movement of the second ring when the reciprocable member and ring move together when said member moves in the opposite direction.

References Cited in the file of this patent

UNITED STATES PATENTS

| | | |
|---|---|---|
| 1,968,650 | Mastin | July 31, 1934 |
| 2,299,395 | Karlberg | Oct. 20, 1942 |
| 2,443,332 | June | June 15, 1948 |
| 2,456,356 | Aber | Dec. 14, 1948 |
| 2,470,419 | Voytech | May 17, 1949 |
| 2,521,692 | Costello | Sept. 12, 1950 |

FOREIGN PATENTS

| | | |
|---|---|---|
| 573,048 | Great Britain | Nov. 5, 1945 |
| 639,102 | Germany | Nov. 28, 1936 |
| 653,626 | Germany | Nov. 29, 1937 |